US007149540B2

(12) United States Patent
Johnson

(10) Patent No.: US 7,149,540 B2

(45) Date of Patent: Dec. 12, 2006

(54) ANTENNA

(75) Inventor: Alan Johnson, Frimley (GB)

(73) Assignee: Nokia Corporation, Espoo (FI)

( * ) Notice: Subject to any disclaimer, the term of this patent is extended or adjusted under 35 U.S.C. 154(b) by 1077 days.

(21) Appl. No.: 10/020,974

(22) Filed: Dec. 19, 2001

(65) Prior Publication Data

US 2002/0089459 A1 Jul. 11, 2002

(30) Foreign Application Priority Data

Dec. 19, 2000 (GB) ................................ 0030971.6

(51) Int. Cl.
*H04M 1/00* (2006.01)

(52) U.S. Cl. .............................. 455/550.1; 455/552.1; 455/575.7

(58) Field of Classification Search ............. 455/550.1, 455/552.1, 575.7, 553.1, 129; 343/700 MS, 343/772, 829, 830, 846, 702
See application file for complete search history.

(56) References Cited

U.S. PATENT DOCUMENTS 5,880,697 A 3/1999 McCarrick et al.
5,903,822 A * 5/1999 Sekine et al. ............ 455/575.7

FOREIGN PATENT DOCUMENTS

EP 0777295 6/1997
WO 99/43043 8/1999

OTHER PUBLICATIONS

European Search Report.

* cited by examiner

*Primary Examiner*—Melur Ramakrishnaiah
(74) *Attorney, Agent, or Firm*—Alston & Bird LLP

(57) ABSTRACT

An antenna comprising a first resonator element (260) for coupling to an antenna feed (264) ; a second resonator element (262) for coupling to ground; the first and second resonator elements arranged to allow field coupling between the first and second resonator elements such that at a first frequency the first and second resonator elements co-operate to allow operation of the first and second resonator elements in a first mode wherein the direction of current flow in one resonator element is different from the direction of current flow in the other resonator element and at a second frequency the first and second resonator elements co-operate to allow operation of the first and second resonator elements in a second mode wherein the direction of current flow in one resonator element is substantially the same as the direction of current flow in the other resonator element.

15 Claims, 8 Drawing Sheets

ANTENNA

BACKGROUND OF THE INVENTION

This invention relates to an antenna, and in particular a dual mode antenna.

Mobile communications are becoming increasingly popular partly due to an increase in performance of communication devices and also to a decrease in their size.

One area, however, in which size reduction runs counter to performance is in antenna design where, generally, smaller antennas give reduced performance compared to larger antennas.

Consequently, to minimise space requirements in communication devices, for example a radiotelephone, the type of antenna typically used is a monopole antenna. The monopole antenna acts as a conductor placed counterpoised to a ground plane, typically a printed circuit board (PCB) in the radiotelephone. The conductor forms an image in the ground plane such that the resulting antenna pattern is a composite of the 'real' antenna (i.e. the monopole antenna) and the 'image' antenna (i.e. the image in the ground plane). Accordingly, a monopole antenna can be half the size of an equivalent dipole antenna providing that the groundplane makes up the other half of the dipole.

However, as communication devices reduce in size so typically does the ground plane associated with the communication device.

Consequently, if the electrical length of the ground plane becomes less than a quarter wave length of the 'real' antenna the antenna image is unable to match the current flow in the 'real' antenna. As a result, the efficiency of the antenna decreases such that either the bandwidth of the antenna is reduced, thereby reducing the performance of the communication device, or a larger 'real' antenna is required in order to compensate for the reduction in size of the ground plane, thereby increasing the size of the communication device.

One solution to this problem has been to use narrow bandwidth antennae that are tuned between different frequencies using a switched matching network. By moving the resonant frequency of an antenna between a range of frequencies, a wide bandwidth antenna can be simulated. However, this solution can increase the complexity and cost of an antenna arrangement and can also reduce performance.

It is desirable to increase the bandwidth of an antenna without a corresponding increase in the size or complexity of a communication device.

SUMMARY OF THE INVENTION

In accordance with an aspect of the present invention there is provided an antenna comprising a first resonator element for coupling to an antenna feed; a second resonator element for coupling to ground; the first and second resonator elements arranged to allow field coupling between the first and second resonator elements such that at a first frequency the first and second resonator elements co-operate to allow operation of the first and second resonator elements in a first mode wherein the direction of current flow in one resonator element is different from the direction of current flow in the other resonator element and at a second frequency the first and second resonator elements co-operate to allow operation of the first and second resonator elements in a second mode wherein the direction of current flow in one resonator element is substantially the same as the direction of current flow in the other resonator element.

This provides an advantage of allowing a single antenna to have two modes of operation; in a first mode the antenna behaves as a first type of antenna, and in a second mode the antenna behaves as a second antenna type. According to a preferred embodiment of the present invention, in the first mode the antenna behaves as a coupled monopole antenna and in the second mode the antenna behaves as a type of inverted F antenna, preferably a planar inverted F antenna (PIFA). Selecting the resonant frequencies of the two antenna modes to be slightly different from each other, allows the two resonant bandwidths to be combined to allow the antenna to have a large bandwidth.

Preferably the first resonator element has a first electrical length and the second resonator element has a second electrical length.

This provides the advantage of easily selecting the resonant frequencies of the two antenna modes to be slightly different by selecting the resonant lengths to be different.

Preferably the first resonator element is arranged in a planar configuration.

Preferably the second resonator element is arranged in a planar configuration.

Suitably the first and second resonator elements are separated in a manner which allows coupling between the resonator elements. The separation may be in a parallel plane or may be transverse.

If desired, a dielectric substrate can be disposed between the first and second resonator elements.

Suitably an antenna according to the present invention may be mounted internally or externally to a suitable communications device.

BRIEF DESCRIPTION OF THE DRAWINGS

For a better understanding of the present invention and to understand how the same may be brought into effect reference will now be made, by way of example only, to the accompanying drawings, in which.

DETAILED DESCRIPTION OF THE INVENTION

Figure 1:
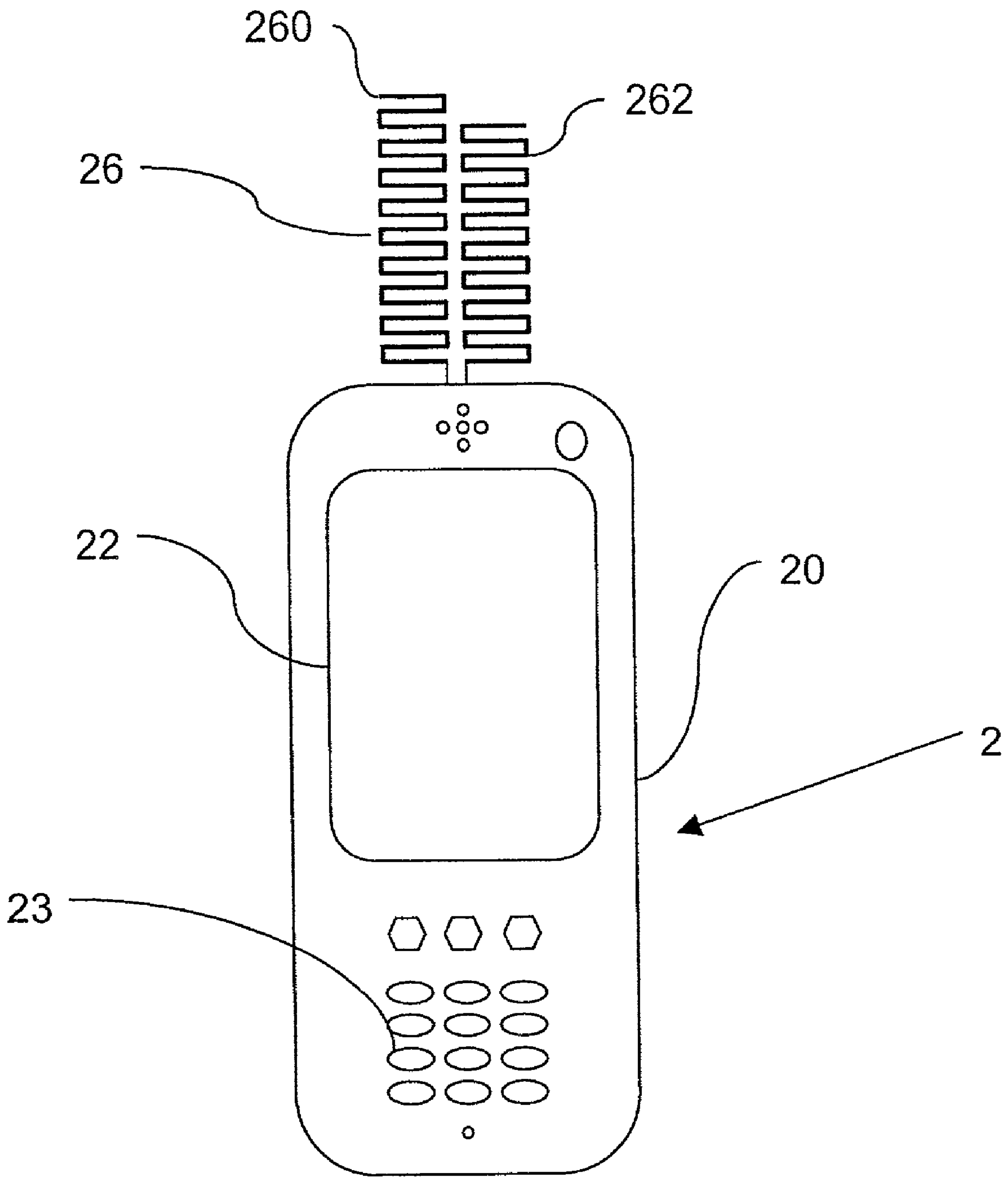
FIG. 1 shows a radiotelephone in accordance with a first embodiment of the present invention.

The radiotelephone 2 of FIG. 1 includes a housing 20 within which is mounted a printed circuit board (PCB) 28 on which are located the electronic components of the radiotelephone, including a transceiver for receiving and transmitting a signal. The housing includes a user interface (22, 23) to allow a user to operate the radiotelephone. In addition the radiotelephone also includes an antenna 26 that is mounted externally to the housing.

As shown in FIGS. 1 and 2, the antenna 26 comprises a first resonator element 260 and a second resonator element 262. The first resonator element 260 is a thin flat conductive element arranged as a meandered monopole, as shown in FIG. 1, to form a planar element. The first resonator element is coupled to the transceiver of the phone via a feed 264.

The second resonator element 262 is of similar design to the first resonator element 260 (i.e. the element is a thin flat conductive element that is arranged as a meandered monopole, to form a planar element). The second element is coupled to the ground plane of the radiotelephone, typically the PCB of the radiotelephone. The second resonator element is mounted in the same plane as the first resonator element 260 but adjacent thereto and extending in the same longitudinal direction as the first resonator element, as shown in FIG. 1.

The first resonator element and second resonator element are mounted relative to each other to allow magnetic and electric field coupling between the first and second elements, as is well known by those skilled in the art.

The lengths of the first resonator element and the second resonator element are selected so that at one frequency the first resonator element and the second resonator element behave as two closely field coupled folded monopole antennas and at another frequency the first resonator element and second resonator element behave as a two dimensional version of an inverted F antenna (IFA).

Figure 2A:
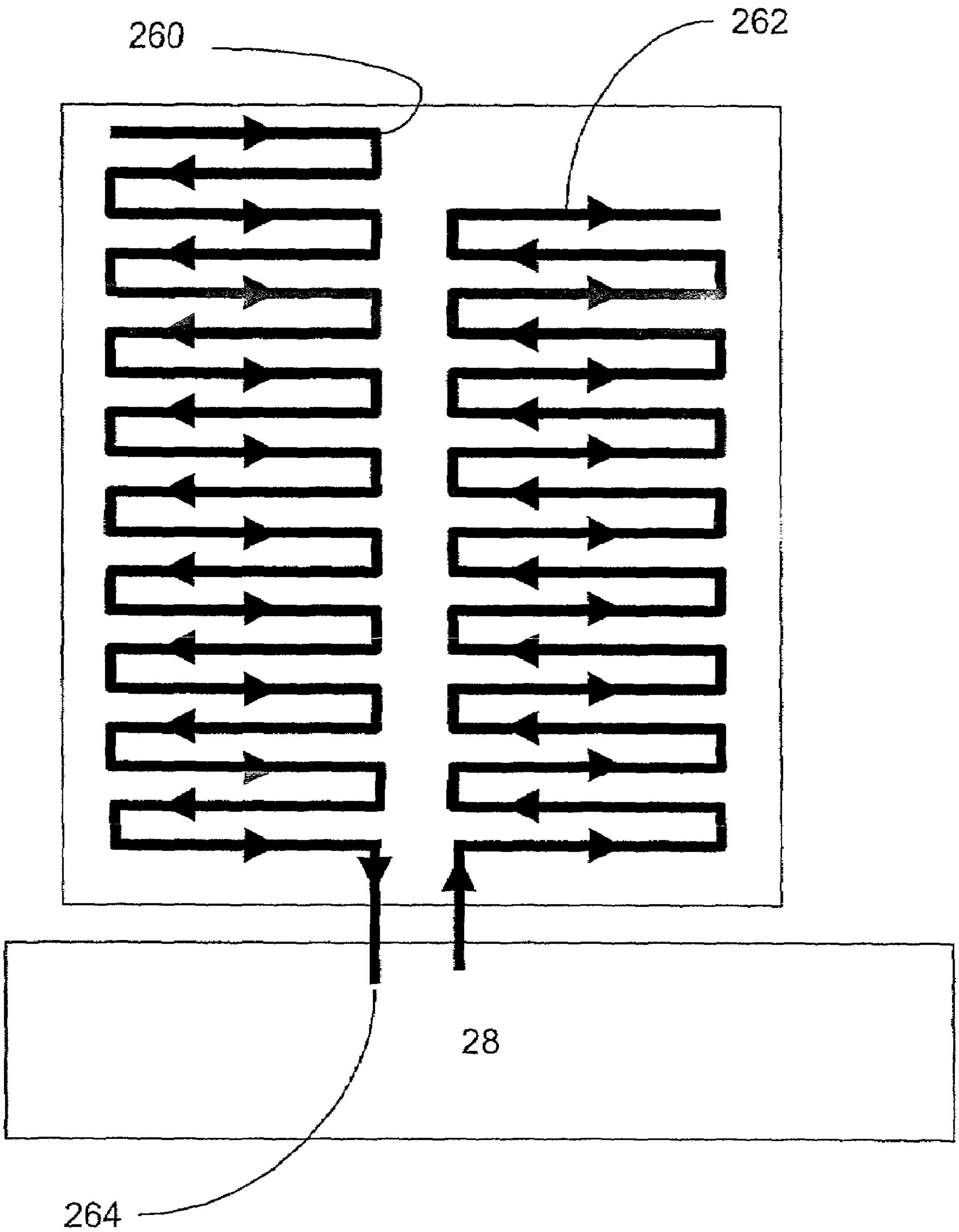
FIGS. 2*a* and 2*b* show the current flow in an antenna according to the first embodiment.
Figure 2B:
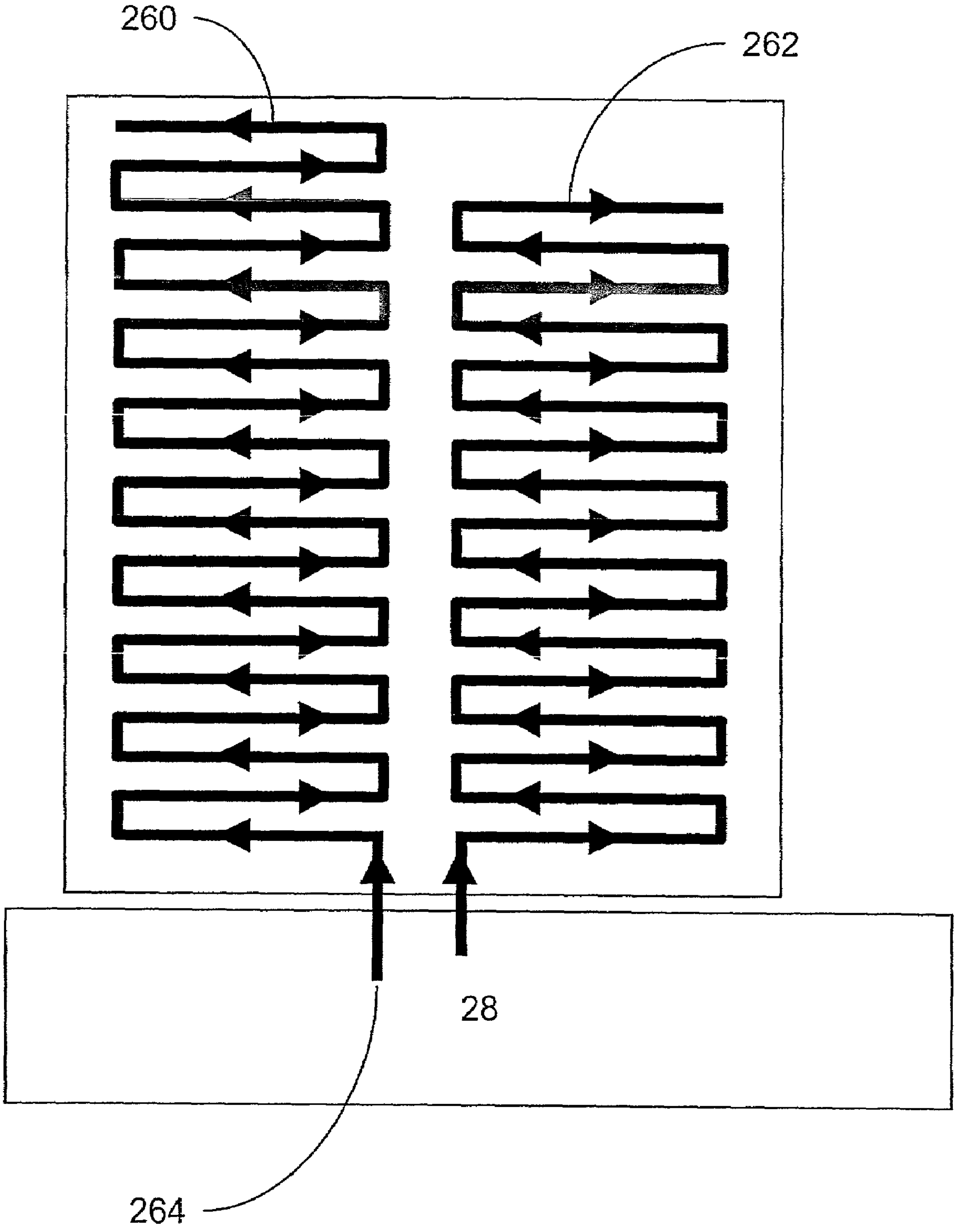

In the closely coupled monopole mode current flows in the same direction in both the first resonator element and the second resonator element, as illustrated in FIG. 2*b*, where the second resonator element is excited by mutual coupling with the first resonator element.

In the PIFA-type mode, as shown in FIG. 2*a*, current flows in one direction in the first resonator element and in the opposite direction in the second resonator element, where the second resonator element acts as a ground plane to the first resonator element.

As the effective electrical length of the antenna for the two modes are different the two modes have different resonant frequencies. By selecting the appropriate lengths of the first resonator element and the second resonator element the two resonant frequencies can be chosen to be close to one another, thereby creating a wide bandwidth antenna.

The lengths of each of the resonator elements are preferably chosen to be one quarter of the wavelength of the desired resonant frequency. However, other lengths could also be used for the resonator elements including three quarters, one and one quarter etc. It should be noted that it is the electrical length of the resonator elements which is of primary importance. It is common for antenna elements to have a meandering pattern, for example as shown in FIG. 1, in order to reduce the overall physical length of the antenna element whilst retaining the same electrical length.

The signals fed to or received by an antenna, including the antenna according to the present invention, are alternating. It is for this reason that it is not important which one of the two resonator elements is fed and which one is grounded.

FIGS. 2*a* and 2*b* shows the current flow in an antenna according to the first embodiment of the present invention. In FIG. 2*a*, in which the resonator elements are acting as a PIFA antenna, it can be seen that, in a first current phase, current flow runs up the first resonator element and down the second resonator element. In a second current phase (not shown) current flows down the first resonator element and up the second resonator element.

FIG. 2*b* shows the current flow in each of the resonator elements in the second mode. It can be seen that, in a first current phase, current flows up the first resonator element and also up the second resonator element. In a second current phase (not shown) current flows down both the first and second resonator elements.

It should be noted that the current direction in each mode does not have to be exactly the same in one mode or exactly opposite in the other mode. The general direction of the current flow is substantially the same in one mode and substantially different in the other. Nor do the resonator elements have to be of the same type.

Figure 3:
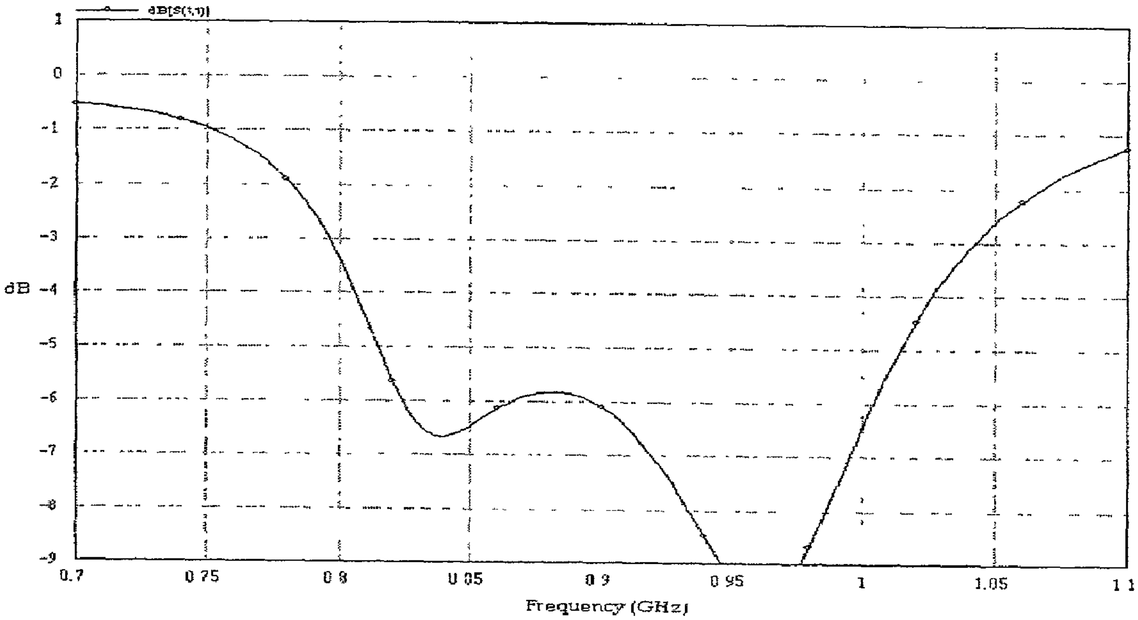
FIG. 3 shows the impedance bandwidth of an antenna according to the first embodiment.

FIG. 3 shows the impedance bandwidth of an antenna according to a first embodiment of the present invention that has a first given electrical length and a second resonator element with a second given electrical length.

According to the first embodiment, for an antenna designed to operate across a frequency band from around 830 MHz to 960 MHz, the first resonator element has an electrical length of approximately 9 cm (approximately quarter of a wavelength at 830 MHz), and the second resonator element has an electrical length of approximately 7 cm (approximately quarter of a wavelength at 960 MHz). This gives resonant frequencies of approximately 830 MHz and 960 MHz respectively for the first and second resonator elements.

The first resonator element and the second resonator element co-operate together in the first, PIFA-type, mode to produce a resonant frequency of 830 MHz. The first resonator element and the second resonator element cooperate together in the second, folded monopole mode to produce a resonant frequency of 960 MHz. From FIG. 3 it can be seen that the associated bandwidths combine to provide a total bandwidth of approximately 180 MHz.

Figure 4:
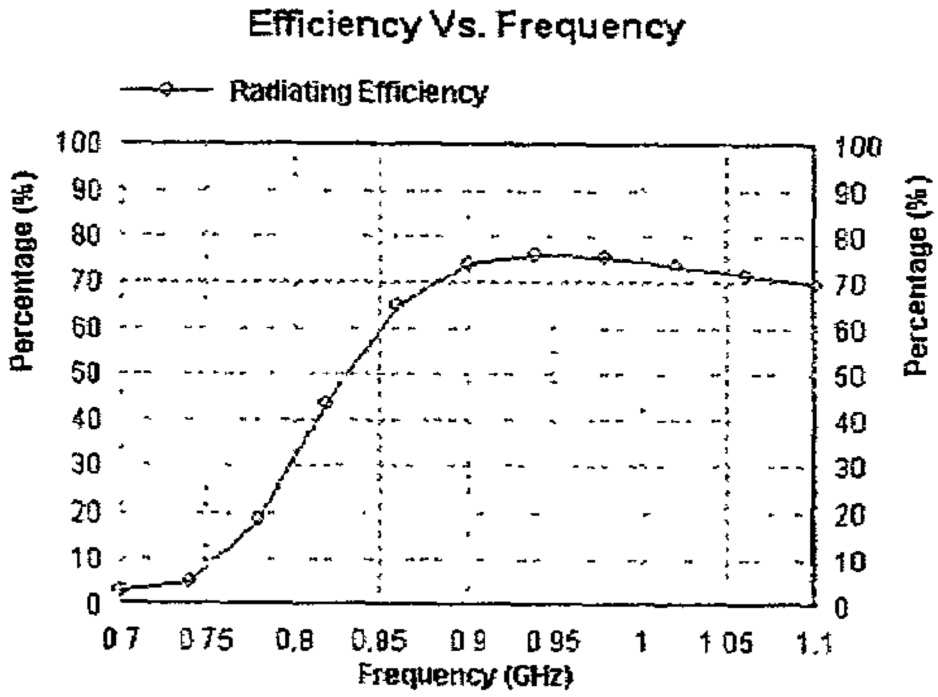
FIG. 4 shows the efficiency of an antenna according to the first embodiment.

FIG. 4 shows the efficiency of an antenna according to the first embodiment.

Once the frequency of the fed element exceeds approximately 890 MHz the coupled resonator elements start to act as monopole antenna as shown in FIG. 4*b*.

Figure 5:
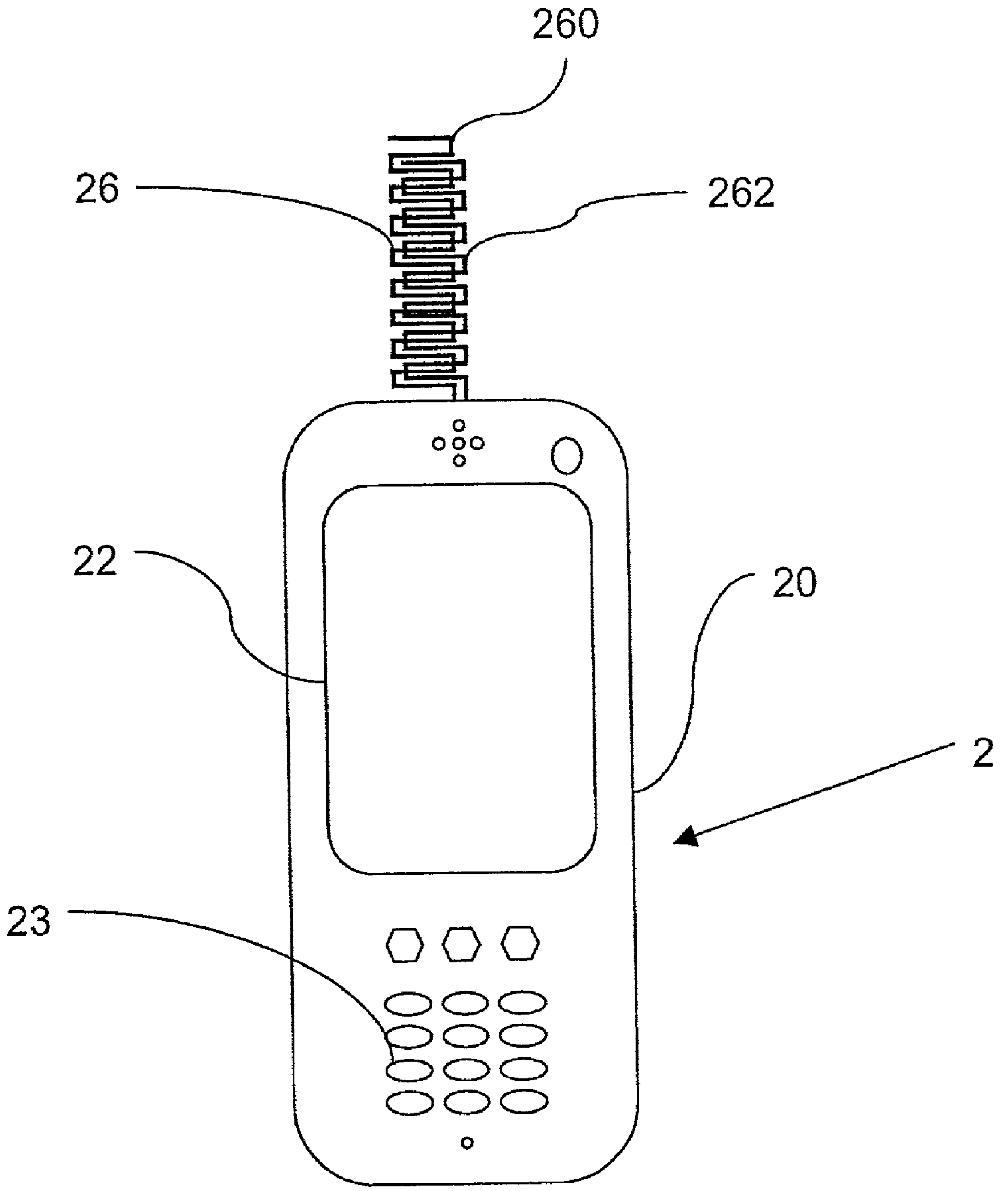
FIG. 5 shows a radiotelephone in accordance with a second embodiment of the present invention.

FIG. 5 shows a radiotelephone in accordance with a second embodiment of the present invention. In this embodiment the first and second resonator elements are positioned in parallel planes substantially overlapping.

The second embodiment works in substantially the same way as the first embodiment, as described above.

The precise electrical lengths of the resonator elements will need to be adjusted depending on the degree of coupling between the two resonator elements. This can be achieved by measuring the frequency response of the antenna with a given degree of coupling and making adjustments to the electrical length of either or both of the resonator elements to provide the desired frequency response. A dielectric may also be disposed between the resonator elements to alter the frequency response of the antenna. Adjustments may also have to made to the electrical length of the resonator elements according to the properties of the chosen dielectric.

Figure 6:
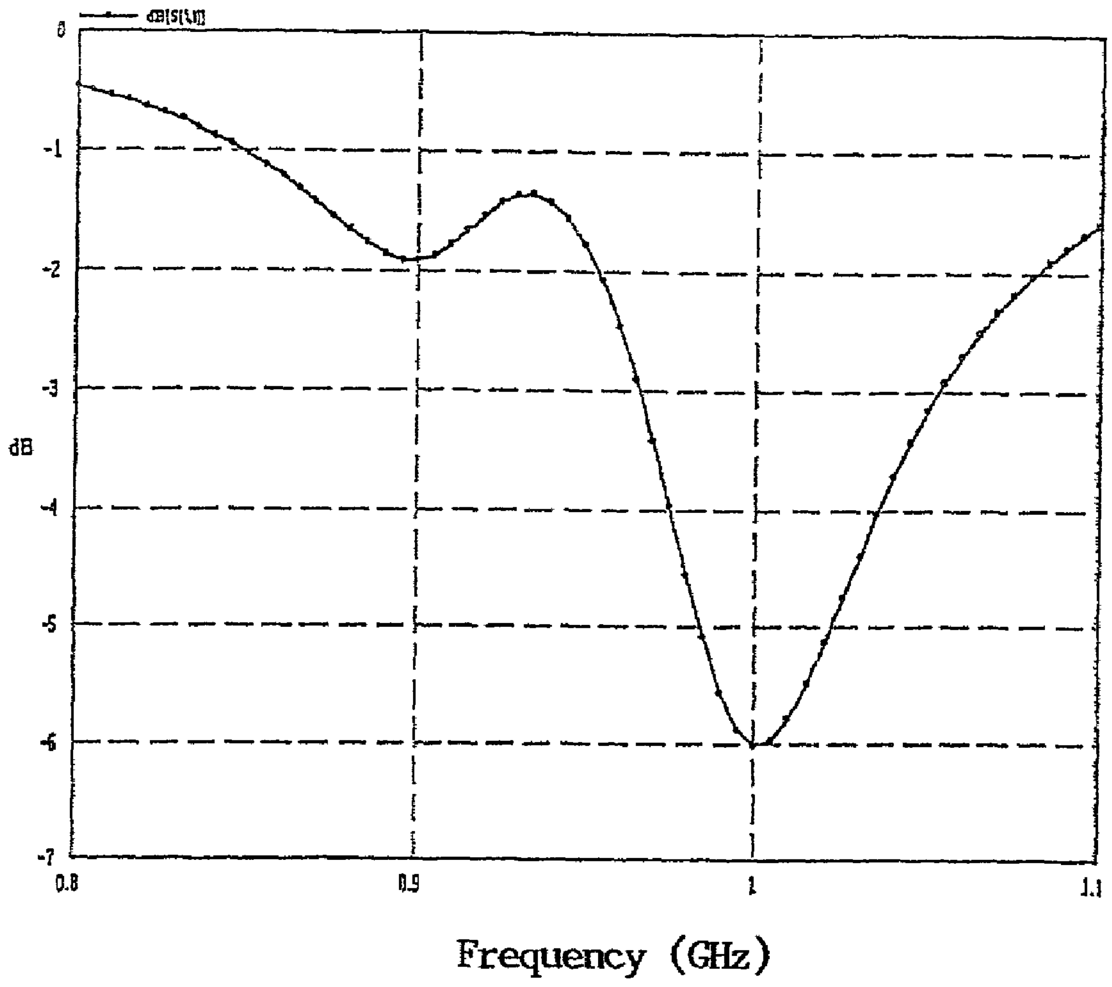
FIG. 6 shows the impedance bandwidth of an antenna according to the second embodiment.

FIG. 6 shows the impedance bandwidth of an antenna according to the second embodiment.

Figure 7A:
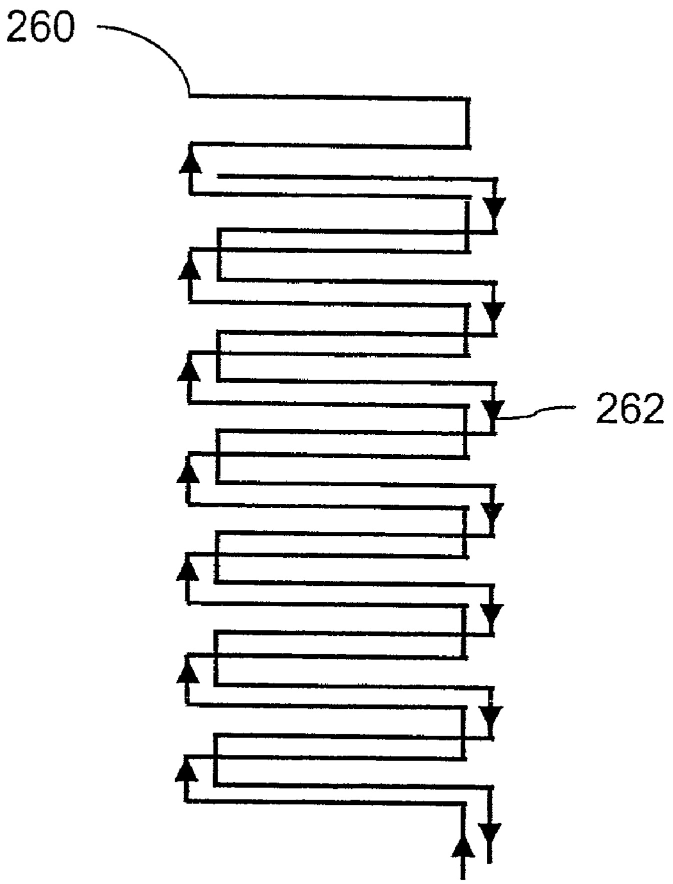
FIGS. 7*a* and 7*b* shows the current flow in an antenna according to the second embodiment.
Figure 7B:
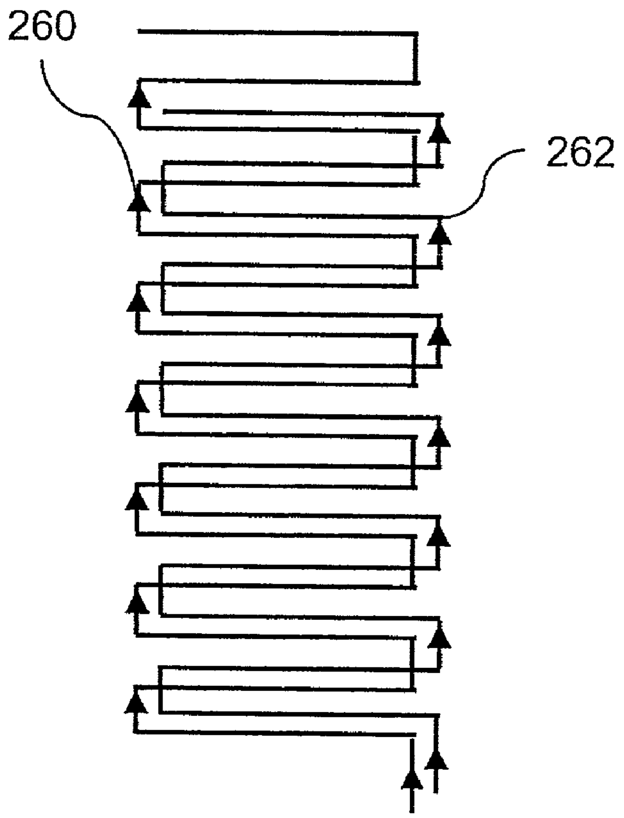

FIGS. 7*a* and 7*b* show the current flow in an antenna according to the second embodiment as shown in FIG. 5. FIG. 7*a* shows the antenna operating in the first mode in which the direction of current flow in one resonator element is different from the direction of current flow in the other resonator element. FIG. 7*b* shows the antenna operating at a second frequency in which the first and second resonator elements co-operate to allow operation of the first and second resonator elements in a second mode wherein the direction of current flow in one resonator element is substantially the same as the direction of current flow in the other resonator element.

The second embodiment of the present invention enables a physically narrower antenna to be produced, although since the two resonator elements are overlying, the height will be slightly greater than that of an antenna according to the first embodiment of the present invention.

What is claimed is:

1. An antenna comprising a first resonator element for coupling to an antenna feed; a second resonator element for coupling to ground; the first and second resonator elements arranged to allow field coupling between the first and second resonator elements such that at a first frequency the first and second resonator elements co-operate to allow operation of the first and second resonator elements in a first mode wherein the direction of current flow in one resonator element is different from the direction of current flow in the other resonator element and at a second frequency the first and second resonator elements co-operate to allow operation of the first and second resonator elements in a second mode wherein the direction of current flow in one resonator element is substantially the same as the direction of current flow in the other resonator element.

2. An antenna according to claim 1, wherein the first resonator element has a first electrical length and the second resonator element has a second electrical length.

3. An antenna according to claim 1, wherein the first mode is an inverted F type mode.

4. An antenna according to claim 1, wherein the second mode is coupled monopole mode.

5. An antenna according to claim 1, wherein the first resonator element forms a monopole antenna.

6. An antenna according to claim 5, wherein the first resonator element is arranged in a planar configuration.

7. An antenna according to claim 1, wherein the second resonator element forms a monopole antenna.

8. An antenna according to claim 1, wherein the first and second resonator elements are arranged in a planar configuration.

9. An antenna according to claim 8, wherein the first and second resonator elements are transversely separated in the plane of the resonator elements.

10. An antenna according to claim 8, wherein the first resonator element is separated from the second resonator element in a plane parallel to the second resonator element.

11. An antenna according to claim 1, wherein a dielectric substrate is disposed between the first and second resonator elements.

12. A communication device having an antenna according to claim 1.

13. A communication device according to claim 12, wherein the antenna is mounted internally to the communication device.

14. A communication device according to claim 12, wherein the antenna is mounted externally to the communication device.

15. An antenna according to claim 1, wherein in the first mode the second resonator element operates as a ground plane to the first resonator element.

* * * * *